United States Patent
Saito et al.

(10) Patent No.: US 10,106,698 B2
(45) Date of Patent: Oct. 23, 2018

(54) COMPOSITION FOR POWDER COATING MATERIAL, POWDER COATING MATERIAL AND COATED ARTICLE

(71) Applicant: Asahi Glass Company, Limited, Chiyoda-ku (JP)

(72) Inventors: Shun Saito, Chiyoda-ku (JP); Masataka Aikawa, Chiyoda-ku (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 15/590,416

(22) Filed: May 9, 2017

(65) Prior Publication Data
US 2017/0240762 A1      Aug. 24, 2017

Related U.S. Application Data

(63) Continuation of application No. PCT/JP2015/081380, filed on Nov. 6, 2015.

(30) Foreign Application Priority Data

Nov. 11, 2014   (JP) .................. 2014-229271

(51) Int. Cl.
| | |
|---|---|
| C09D 127/16 | (2006.01) |
| C09D 133/12 | (2006.01) |
| C09D 163/00 | (2006.01) |
| C09D 167/00 | (2006.01) |
| C09D 175/04 | (2006.01) |
| C09D 5/03 | (2006.01) |
| C23C 4/12 | (2016.01) |

(52) U.S. Cl.
CPC ............ *C09D 127/16* (2013.01); *C09D 5/03* (2013.01); *C09D 133/12* (2013.01); *C09D 163/00* (2013.01); *C09D 167/00* (2013.01); *C09D 175/04* (2013.01); *C23C 4/12* (2013.01)

(58) Field of Classification Search
CPC ................................................... C09D 127/16
See application file for complete search history.

(56) References Cited

U.S. PATENT DOCUMENTS

| | | | |
|---|---|---|---|
| 4,916,188 A | 4/1990 | Reising | |
| 5,346,727 A | 9/1994 | Simkin | |
| 5,405,912 A | 4/1995 | Simkin | |
| 6,476,151 B1 | 11/2002 | Araki et al. | |
| 2001/0003127 A1 | 6/2001 | Tsuda et al. | |
| 2004/0096669 A1 | 5/2004 | Kim | |
| 2004/0176554 A1 | 9/2004 | Ishida | |
| 2004/0266914 A1 | 12/2004 | Yamauchi et al. | |
| 2015/0072151 A1 | 3/2015 | Saito et al. | |

FOREIGN PATENT DOCUMENTS

| | | |
|---|---|---|
| JP | 2-185573 | 7/1990 |
| JP | 6-108103 | 4/1994 |
| JP | 9-165535 | 6/1997 |
| JP | 9-302274 | 11/1997 |
| JP | 10-130543 | 5/1998 |
| JP | 2003-128994 | 5/2003 |
| JP | 2003-213196 | 7/2003 |
| JP | 2004-169034 | 6/2004 |
| JP | 2008-81527 | 4/2008 |
| JP | 2014-113735 | 6/2014 |
| WO | WO99/33891 A1 | 7/1999 |
| WO | WO 2014/002964 A1 | 1/2014 |
| WO | WO 2016/002724 A1 | 1/2016 |

OTHER PUBLICATIONS

International Search Report dated Feb. 9, 2016 in PCT/JP2015/081380, filed on Nov. 6, 2015.

*Primary Examiner* — Mark S Kaucher
(74) *Attorney, Agent, or Firm* — Oblon, McClelland, Maier & Neustadt, L.L.P.

(57) ABSTRACT

To provide a composition for powder coating material capable of forming a coating film having excellent water and oil repellency, capable of maintaining excellent water and oil repellency even when the surface is rubbed or when used in an environment in contact with water, and having excellent resistance to adhesion of organisms such that organisms such as mold, algae, etc. are less likely to adhere thereto; a powder coating material; and a coated article. The composition for powder coating material comprises polymer (A) composed of at least one member selected from polymer (A1) and polyvinylidene fluoride, and polymer (B). The polymer (A1) is a fluorinated non-block copolymer having units based on a fluoroolefin and units based on a monomer having a crosslinkable group. The polymer (B) is a fluorinated block copolymer having a segment ($\alpha$) in which the content of fluorine atoms is at least 20 mass %, and a segment ($\beta$) in which the content of fluorine atoms is less than 20 mass %, wherein the difference in the numerical value of the content of the fluorine atoms represented by mass %, between in the segment ($\alpha$) and in the segment ($\beta$) is at least 10, and at least one of the segment ($\alpha$) and the segment ($\beta$) has a hydroxy group.

14 Claims, No Drawings

COMPOSITION FOR POWDER COATING MATERIAL, POWDER COATING MATERIAL AND COATED ARTICLE

TECHNICAL FIELD

The present invention relates to a composition for powder coating material, and a powder coating material and coated article using the same.

BACKGROUND ART

Heretofore, a coating film excellent in various physical properties such as stain resistance (water-repellency, oil-repellency), scratch resistance, water resistance, chemical resistance, hardness, etc., has been formed, in many cases, as a plumbing wall material for a kitchen, bathroom, wash room, toilet, etc. in a residential building, or as a surface material for a storage furniture such as a cupboard.

On the other hand, in recent years, sick house syndrome has become problematic, and as a coating material for forming a coating film to be provided in a residential building, there is an increasing expectation for a powder coating material which does not contain organic solvents (VOC) at all.

As raw materials for powder coating materials, acrylic resins, polyester resins, epoxy resins, etc. have been mainly used.

However, coating films formed from powder coating materials using such resins as raw materials were inferior in water repellency/oil repellency, and could not be said to be satisfactory from the viewpoint of stain resistance.

Therefore, in order to increase the water repellency/oil repellency of a coating film, a method of blending a fluorosilicone additive to a powder coating material (see Patent Document 1), a method of blending a fluorinated leveling agent to a powder coating material (see Patent Document 2), or a method of blending a resin containing fluorine elements and silicon elements to a powder coating material (see Patent Document 3) has been proposed.

PRIOR ART DOCUMENTS

Patent Documents

Patent Document 1: JP-A-10-130543
Patent Document 2: JP-A-2008-81527
Patent Document 3: JP-A-2014-113735

DISCLOSURE OF INVENTION

Technical Problem

However, the coating film formed from the powder coating material disclosed in each of Patent Documents 1 to 3 is still insufficient in water repellency/oil repellency. Further, in a case where the coating film surface is rubbed in anticipation of removal of contaminants, or in a case where the coating film is immersed in water in a simulation of such an environment that the coating film is contact with water, there is a problem that the water repellency/oil repellency of the coating film is substantially reduced.

Further, in a case where a coating film was formed on a highly dump plumbing product by the powder coating material disclosed in each of Patent Documents 1 to 3, there was a problem such that fungi, algae, etc. were likely to develop and adhere to the surface of the coating film.

An object of the present invention is to provide a composition for powder coating material capable of forming a coating film which is excellent in water repellency/oil repellency, which is capable of maintaining excellent water repellency/oil repellency even if its surface is rubbed, or even if it is provided in an environment in contact with water, and which further has excellent resistance to adhesion of organisms such that organisms such as mold, algae, etc. are less likely to adhere thereto; a powder coating material using such a composition for powder coating material; and a coated article having a coating film formed by such a powder coating material.

Solution to Problem

The present invention has the following constructions [1] to [14].

[1] A composition for powder coating material comprising polymer (A) composed of at least one member selected from the following polymer (A1) and polyvinylidene fluoride, and the following polymer (B), Polymer (A1): a fluorinated non-block copolymer having units based on a fluoroolefin and units based on a monomer having a crosslinkable group, Polymer (B): a fluorinated block copolymer having a segment ($\alpha$) in which the content of fluorine atoms is at least 20 mass %, and a segment ($\beta$) in which the content of fluorine atoms is less than 20 mass %, wherein the difference in the numerical value of the content of fluorine atoms as represented by mass % between in said segment ($\alpha$) and in said segment ($\beta$) is at least 10, and at least one of said segment ($\alpha$) and said segment ($\beta$) has a hydroxy group.

[2] The composition for powder coating material according to [1], wherein the content of the polymer (B) is from 0.1 to 100 parts by mass, to 100 parts by mass of the polymer (A).

[3] The composition for powder coating material according to [1] or [2], wherein the units based on a monomer having a crosslinkable group in the polymer (A1) are units based on a monomer having a hydroxy group.

[4] The composition for powder coating material according to any one of [1] to [3], wherein said segment ($\alpha$) has a unit based on a monomer having a perfluoroalkyl group having from 3 to 21 carbon atoms.

[5] The composition for powder coating material according to any one of [1] to [4], wherein the segment having a hydroxy group in the polymer (B) has a unit based on a monomer having a hydroxy group.

[6] The composition for powder coating material according to any one of [1] to [5], wherein the segment having a hydroxy group in the polymer (B) is the segment ($\beta$).

[7] The composition for powder coating material according to any one of [1] to [6], which further contains a resin (C) being a resin other than the polymer (A) and the polymer (B).

[8] The composition for powder coating material according to [7], wherein the resin (C) is at least one member selected from an acrylic resin, a polyester resin, a polyurethane resin, an epoxy resin and a silicone resin.

[9] The composition for powder coating material according to [7] or [8], wherein the resin (C) is a resin having hydroxy groups or carboxy groups.

[10] The composition for powder coating material according to any one of [1] to [9], wherein the composition for powder coating material further contains a curing agent.

[11] A powder coating material comprising a powder composed of the composition for powder coating material as defined in any one of [1] to [10].
[12] A coated article having a coating film formed from the powder coating material as defined in [11].
[13] The coated article according to [12], wherein the water contact angle of the coating film is from 95 to 160°.
[14] The coated article according to [12] or [13], wherein the material of the substrate is aluminum.

Advantageous Effects of Invention

According to the present invention, it is possible to provide a composition for powder coating material capable of forming a coating film which is excellent in water repellency/oil repellency, which is capable of maintaining excellent water repellency/oil repellency even if its surface is rubbed, or even if it is provided in an environment in contact with water, and which further has excellent resistance to adhesion of organisms such that organisms such as mold, algae, etc. are less likely to adhere thereto; a powder coating material using such a composition for powder coating material; and a coated article having a coating film formed by such a powder coating material.

DESCRIPTION OF EMBODIMENTS

The following definitions of terms apply throughout the present specification including claims.

A "fluorinated block copolymer" means a polymer compound composed of plural types of segments different in the kind of units contained, or different in the composition of units in the case of the same kind, wherein at least one segment has fluorine atoms.

A "fluorinated non-block copolymer" means a polymer compound having fluorine atoms in its molecule, and a copolymer other than the above "fluorinated block copolymer".

A "fluorinated monomer" means a monomer having fluorine atom(s).

A "non-fluorinated monomer" means a monomer having no fluorine atom.

A "fluoroalkyl group" is an alkyl group having all or some of its hydrogen atoms substituted by fluorine.

A "fluoroalkenyl group" is an alkenyl group having all or some of its hydrogen atoms substituted by fluorine.

A "(meth)acrylate" is a general term for an acrylate and a methacrylate, and "(meth)acryl" is a general term for "acryl" and "methacryl".

A "unit" means a moiety which is present in a polymer to constitute the polymer and which is derived from a monomer. A moiety derived from a monomer having a carbon-carbon unsaturated double bond, as formed by addition polymerization of the monomer, will also be referred to as a "unit based on the monomer". Such a unit based on the monomer is a divalent unit formed by cleavage of the unsaturated double bond. Further, one having the structure of a certain unit chemically converted after formation of a polymer, will also be referred to as a unit.

In the following, as the case requires, a unit derived from an individual monomer or a unit based on a monomer will be referred to by a name having "unit" attached to the monomer's name.

[Composition for Powder Coating Material]

The composition for powder coating material of the present invention is a composition for powder coating material comprising polymer (A) and polymer (B), wherein the polymer (A) is composed of at least one polymer selected from polymer (A1) and polyvinylidene fluoride. The polymer (A1) is a fluorinated non-block copolymer having units (hereinafter referred to as units (a1)) based on a fluoroolefin and units (hereinafter referred to as units (a2)) based on a monomer having a crosslinkable group, and the polymer (B) is a specific fluorinated block copolymer as described later.

The polymer (A) is at least one polymer selected from the polymer (A1) and polyvinylidene fluoride.

The composition for powder coating material of the present invention may contain both of the polymer (A1) and polyvinylidene fluoride, but it is also preferred to contain only one of them depending upon the purpose. The composition for powder coating material of the present invention more preferably contains only the polymer (A1) as the polymer (A).

(Polymer (A1))

The polymer (A1) is a fluorinated non-block copolymer having units (a1) and units (a2). The polymer (A1) may contain, as the case requires, units (hereinafter referred to as units (a3)) based on a monomer other than the fluoroolefin and the monomer having a crosslinkable group. The polymer (A1) being a fluorinated non-block copolymer may, for example, be a fluorinated alternating copolymer or a fluorinated random copolymer.

<Units (a1)>

The fluoroolefin to form units (a1), is a compound having at least one of hydrogen atoms in an olefin (the formula $C_nH_{2n}$) substituted by a fluorine atom.

The number of carbon atoms in the fluoroolefin is preferably from 2 to 8, more preferably from 2 to 4, particularly preferably 2.

The proportion of the number of fluorine atoms to the total number of fluorine atoms and hydrogen atoms in the fluoroolefin is preferably at least 25%, more preferably at least 50%, and it may be 100%. When the number of fluorine atoms is at least 25%, it is easy to form a coating film having excellent weather resistance. In the fluoroolefin, at least one hydrogen atom not substituted by a fluorine atom may be substituted by a chlorine atom. When the fluoroolefin has a chlorine atom, it will be easy to disperse a pigment (titanium oxide pigment or a colored organic pigment such as cyanine blue, cyanine green, etc.) in the fluorinated non-block copolymer (A1). Further, it will be possible to design the glass transition temperature of the fluorinated non-block copolymer (A1) to be at least 30° C. and to suppress blocking of the coating film.

As the fluoroolefin, preferred is at least one member selected from the group consisting of tetrafluoroethylene (hereinafter referred to also as "TFE"), chlorotrifluoroethylene (hereinafter referred to also as "CTFE"), hexafluoropropylene, vinylidene fluoride and vinyl fluoride, and particularly preferred is TFE or CTFE.

As the fluoroolefin, one type may be used alone, or two or more types may be used in a combination.

As the fluoroolefin units, units formed directly by polymerization of a fluoroolefin are preferred.

<Units (a2)>

A monomer (hereinafter referred to as monomer (m2)) having a crosslinkable group to form units (a2) may be a monomer having, as the crosslinkable group, at least one member selected from a hydroxy group, a carboxy group, an amino group, an epoxy group, an oxetanyl group and an alkoxysilyl group. The monomer (m2) is, from the viewpoint of excellent crosslinkability, preferably a monomer having a hydroxy group or a monome having a carboxy group, more preferably a monomer having a hydroxy group.

By using a polymer (A1) having units (a2), it is possible to form a coating film excellent in stain resistance, water resistance, acid resistance and alkali resistance. Further, when the polymer (A1) has at least one type selected from units based on a monomer having a hydroxy group and units based on a monomer having a carboxy group, the curing speed will be excellent in a case where the composition for powder coating material contains, as an after-mentioned curing agent, an isocyanate-type curing agent (particularly, a blocked isocyanate-type curing agent). Further, such is preferred, for example, in that it becomes easy to disperse e.g. titanium oxide pigment, and a coating film of high gloss will be obtainable.

As the monomer (m2), one type may be used alone, or two or more types may be used in combination.

The monomer having a hydroxy group may be a fluorinated monomer or may be a non-fluorinated monomer, and a non-fluorinated monomer is preferred. Said monomer may, for example, be allyl alcohol, a hydroxyalkyl vinyl ether (2-hydroxyethyl vinyl ether, 4-hydroxybutyl vinyl ether, cyclohexanediol monovinyl ether, etc.), a hydroxyalkyl allyl ether (2-hydroxyethyl allyl ether), a vinyl hydroxyalkanoate (vinyl hydroxypropionate, etc.), a hydroxyalkyl (meth)acrylate (hydroxyethyl (meth)acrylate, etc.), etc.

As the monomer having a hydroxy group, one type may be used alone, or two or more types may be used in combination.

A unit having a hydroxy group may be a unit obtained by introducing a hydroxy group by conversion of a reactive group of a polymer. For example, a polymer having units (a1), units (a2) based on a monomer having a crosslinkable group other than a hydroxy group, and, as the case requires, units (a3), is reacted with a compound having a second crosslinkable group and a hydroxy group reactive with said crosslinkable group, to form a unit having a hydroxy group.

The monomer having a carboxy group may be a fluorinated monomer or may be a non-fluorinated monomer, and a non-fluorinated monomer is preferred. Said monomer may, for example, be a monomer such as (meth)acrylic acid, crotonic acid, isocrotonic acid, 10-undecylenic (undecene) acid, 9-octadecenoic acid (oleic acid), fumaric acid, maleic acid, etc.

As the monomer having a carboxy group, one type may be used alone, or two or more types may be used in combination.

A unit having a carboxy group may be formed, for example, by converting a hydroxy group in a polymer having a unit having the hydroxy group, to a carboxy group by the following methods.

a. A method of reacting, in an organic solvent, an acid anhydride to a hydroxy group in a polymer having the hydroxy group, to form an ester bond and a carboxy group.

b. A method of melt-kneading an acid anhydride and a polymer having a hydroxy group to let the acid anhydride be reacted with the hydroxy group to form an ester bond and a carboxy group.

The carboxy group introduced by such methods is derived from an acid anhydride. Here, after forming a carboxy group by the above methods, some of hydroxy groups may remain in the polymer.

The acid anhydride may be a dibasic acid anhydride.

The dibasic acid anhydride may, for example, be succinic anhydride, glutaric anhydride, itaconic anhydride, anhydrous 1,2-cyclohexanedicarboxylic acid (hexahydrophthalic anhydride), anhydrous cis-4-cyclohexene-1,2-dicarboxylic acid, phthalic anhydride, 4-methylhexahydrophthalic anhydride, 1,8-naphthalic anhydride, maleic anhydride, etc.

<Units (a3)>

The monomer to form units (a3) (hereinafter referred to as the monomer (m3)) may be a fluorinated monomer or may be a non-fluorinated monomer, and a non-fluorinated monomer is preferred. As the monomer (m3), a vinyl monomer, i.e. a compound having a carbon-carbon double bond is preferred. The vinyl monomer is excellent in alternating copolymerizability with a fluoroolefin, whereby the polymerization yield can be increased. Further, even when it remains unreacted, it presents a less impact on the coating film and can be easily removed in the production process.

The vinyl monomer may, for example, be a vinyl ether compound, an allyl ether compound, vinyl carboxylate, allyl carboxylate, an olefin compound, etc.

The vinyl ether compound may, for example, be a cycloalkyl vinyl ether (cyclohexyl vinyl ether (hereinafter referred to also as "CHVE"), etc.), or an alkyl vinyl ether (nonyl vinyl ether, 2-ethylhexyl vinyl ether, hexyl vinyl ether, ethyl vinyl ether, n-butyl vinyl ether, tert-butyl vinyl ether, etc.).

The allyl ether compound may, for example, be an alkyl allyl ether (ethyl allyl ether, hexyl allyl ether, etc.).

The vinyl carboxylate may, for example, be a vinyl ester of a carboxylic acid (acetic acid, butyric acid, pivalic acid, benzoic acid, propionic acid, etc.). Further, as a vinyl ester of a carboxylic acid having a branched alkyl group, commercially available VeoVa-9 or VeoVa-10 (each manufactured by Shell Chemicals, trade name) may be used.

The allyl carboxylate may, for example, be an allyl ester of a carboxylic acid (acetic acid, butyric acid, pivalic acid, benzoic acid, propionic acid, etc.).

The olefin may, for example, be ethylene, propylene, isobutylene, etc.

As the monomer (m3), from such a viewpoint that the glass transition temperature of the polymer (A1) can be designed to be at least 30° C., and it is possible to suppress blocking of the coating film, a cycloalkyl vinyl ether is preferred, and CHVE is particularly preferred.

As the monomer (m3), from the viewpoint of excellent flexibility of the coating film, preferred is one having a linear or branched alkyl group having at least 3 carbon atoms.

As the monomer (m3), one type may be used alone, or two or more types may be used in combination.

In a case where the monomer having a crosslinkable group is a monomer having a hydroxy group, as a combination of monomers to constitute the fluorinated non-block copolymer (A1), from the viewpoint of weather resistance, adhesion, flexibility and blocking resistance, the following combination (1) is preferred, and the following combination (2) is particularly preferred.

Combination (1)
  Fluoroolefin: TFE or CTFE,
  Monomer having a hydroxy group: a hydroxyalkyl vinyl ether,
  Monomer (m3): at least one member selected from a cycloalkyl vinyl ether, an alkyl vinyl ether and a vinyl carboxylate.

Combination (2)
  Fluoroolefin: CTFE,
  Monomer having a hydroxy group: a hydroxyalkyl vinyl ether,
  Monomer (m3): CHVE.

The proportion of fluoroolefin units is preferably from 30 to 70 mol %, particularly preferably from 40 to 60 mol %, in all units (100 mol %) in the copolymer (A1).

When the fluoroolefin units are at least the above lower limit value, the coating film will be excellent in weather resistance, and when they are at most the above upper limit value, the coating film will be more excellent in stain resistance, water resistance, acid resistance and alkali resistance.

The proportion of units (a2) is preferably from 0.5 to 20 mol %, particularly preferably from 1 to 15 mol %, in all units (100 mol %) in the polymer (A1).

When the proportion of units (a2) is at least the above lower limit value, the coating film will be more excellent in stain resistance, water resistance, acid resistance and alkali resistance. When the proportion of units (a2) is at most the above upper limit value, the scratch resistance of the coating film will be excellent.

The proportion of units (a3) is preferably from 20 to 60 mol %, particularly preferably from 30 to 50 mol %, in all units (100 mol %) in the polymer (A1).

When the proportion of units (a3) is at least the above lower limit value, the glass transition temperature of the polymer (A1) will be proper, and it will be easy to produce a powder coating material. When the proportion of units (a3) is at most the above upper limit value, blocking of the coating film will be suppressed, and the coating film will be more excellent in flexibility.

The content of each of the respective units in the polymer (A1) can be obtained by a proton NMR method, a carbon NMR method, etc.

The number average molecular weight of the polymer (A1) is preferably from 3,000 to 50,000, more preferably from 5,000 to 30,000. When the number average molecular weight of the polymer (A1) is at least the above lower limit value, the coating film will be excellent in water resistance and salt water resistance. When the number average molecular weight of the polymer (A1) is at most the above upper limit value, the coating film will be excellent in surface smoothness.

In the present specification, the number-average molecular weight and the after-mentioned mass-average molecular weight are values obtained as calculated as polystyrene by a gel permeation chromatography (GPC) method.

The hydroxy value of the polymer (A1) having hydroxy groups is preferably from 5 to 100 mgKOH/g, more preferably from 10 to 80 mgKOH/g. When the hydroxy value is at least the above lower limit value, the coating film will be more excellent in the stain resistance, water resistance, acid resistance and alkali resistance. When the hydroxy value is at most the above upper limit value, the coating film will be excellent in crack resistance under temperature cycles of a high temperature of at least 100° C. and a low temperature of at most 10° C.

In the present specification, the measurement of the hydroxy value is carried out in accordance with JIS K 1557-1:2007 (ISO 14900:2001), or JIS K 0070:1992.

The glass transition temperature of the polymer (A1) is preferably from 30 to 150° C., more preferably from 35 to 120° C., particularly preferably from 35 to 100° C. When the glass transition temperature of the polymer (A1) is at least the above lower limit value, it will be easy to produce a powder coating material. When the glass transition temperature of the polymer (A1) is at most the above upper limit value, the surface smoothness of the coating film will be excellent.

In the present specification, the glass transition temperature is the midpoint glass transition temperature measured by a differential scanning calorimetry (DSC) method.

The melting point of the polymer (A1) is preferably at most 300° C., more preferably at most 200° C., particularly preferably at most 180° C. When the melting point of the polymer (A1) is at most the above upper limit value, the coating film will be excellent in surface smoothness.

In the present specification, the melting point is a value obtained by using a differential scanning calorimeter.

(Polyvinylidene Fluoride)

A coating film formed from a powder coating material comprising polyvinylidene fluoride (hereinafter referred to also as "PVDF") is more excellent in flexibility and impact resistance.

PVDF is a polymer composed of units based on vinylidene fluoride (hereinafter referred to also as "VDF").

The mass average molecular weight (Mw) of PVDF is preferably from 100,000 to 500,000, more preferably from 150,000 to 400,000. The number-average molecular weight (Mn) of PVDF is preferably from 50,000 to 400,000, more preferably from 100,000 to 300,000.

When the mass average molecular weight (Mw) and the number-average molecular weight (Mn) are at least the respective lower limit values in the above ranges, pulverization will be easy at the time of forming a powder coating material, and it will be easy to control the powder particle size. When the mass average molecular weight (Mw) and the number-average molecular weight (Mn) are at most the respective upper limit values in the above ranges, pigment dispersibility, etc. will be excellent, coating spreadability to a substrate becomes good, and consequently, it is possible to obtain a coating film excellent in adhesion to the substrate and in corrosion resistance.

The melting point of PVDF is preferably from 100 to 250° C., particularly preferably from 140 to 200° C. When the melting point is at least the lower limit value in the above range, pulverization will be easy at the time of forming a powder coating material, and it will be easy to control the powder particle size. When the melting point is at most the upper limit value in the above range, it will be possible to form a coating film having more excellent surface smoothness. The melting point of PVDF can be controlled by e.g. adjusting the molecular weight.

(Polymer (B))

The polymer (B) is a component to impart excellent water repellency, oil repellency, resistance to adhesion of organisms, etc.

The polymer (B) is a fluorinated block copolymer composed of two segments different in the content (by mass) of fluorine atoms. Of the two segments, segment (α) is a segment in which the content of fluorine atoms is at least 20 mass % to all atoms (100 mass %) constituting the segment (α), and segment (β) is a segment in which the content of fluorine atoms is less than 20 mass % to all atoms (100 mass %) constituting the segment (β). Further, the difference in the numerical value of the content of fluorine atoms represented by mass % between in both segments is at least 10. Furthermore, at least one of the segment (α) and the segment (β) is a segment having a hydroxy group.

The respective segments are different in the kind of units contained, or different in the composition of units in the case of the same kind.

The hydroxy group in the copolymer (B) is preferably present in at least the segment (β), and further, preferably no hydroxy group is present in the segment (α). By the presence of a hydroxy group in the segment (β) in the polymer (B), the segment (α) tends to be readily oriented at the surface of the coating film, whereby water repellency, oil repellency, resistance to adhesion of organisms, etc. tend to be easily developed.

Here, the polymer (B) may have, so long as it has a hydroxy group, a crosslinkable group other than a hydroxy group, such as a carboxy group, an amino group, etc.

Further, the polymer (B) may have, in addition to the segment (α) and the segment (β), a moiety based on the polymerization initiator used in the production of the polymer (B), etc.

The segment (α) is, since the content of fluorine atoms is high in the above-mentioned range, considered to impart excellent water repellency, oil repellency, resistance to adhesion of organisms, etc. to the coating film.

The segment (β) is a segment in which the content of fluorine atoms is smaller than the segment (α), and thus, is considered to contribute to the affinity to the polymer (A) and adhesion to a substrate. When the affinity to the polymer (A) and the adhesion to the substrate are excellent, it is considered that the water-repellency, oil-repellency and resistance to adhesion of organisms of the coating film can be thereby sufficiently maintained.

Further, the polymer (B) has a hydroxy group, and the hydroxy group is considered to react with a crosslinkable group when another component contained in the composition for powder coating material has such a crosslinkable group, etc. By crosslinking of the hydroxy group in the polymer (B), it is considered that the coating film will be sufficiently cured, and the formed coating film can sufficiently maintain its properties (water repellency, oil repellency, resistance to adhesion of organisms, etc.). Therefore, a coating film formed by using the composition for powder coating material containing the polymer (B), is considered to be able to maintain the excellent water repellency/oil repellency and have excellent resistance to adhesion of organisms, whereby organisms such as fungus, algae, etc. are less likely to adhere, even if the surface is rubbed, or even if the coating film is provided in an environment in contact with water.

The segment (α) is preferably composed of a homopolymer of a fluorinated monomer, a copolymer composed of two or more fluorinated monomers, or a copolymer composed of at least one fluorinated monomer and at least one non-fluorinated monomer. The segment (β) is preferably composed of a homopolymer of a non-fluorinated monomer, a copolymer composed of two or more non-fluorinated monomers, or a copolymer composed of at least one non-fluorinated monomer and at least one fluorinated monomer.

In a case where segment (α) is composed of a copolymer of a fluorinated monomer and a non-fluorinated monomer, and the segment (β) is composed of a copolymer of a non-fluorinated monomer and a fluorinated monomer, even if the fluorinated monomer and the non-fluorinated monomer are the same monomers in both segments, the unit compositions are different between the segment (α) and the segment (β).

The fluorinated monomer is preferably a monomer having a structure represented by the following formula (I) or (II).

$$R^F R^2 OCOC(R^3)=CH_2 \qquad (I)$$

$$R^F OArCH_2 OCOC(R^3)=CH_2 \qquad (II)$$

As the fluorinated monomer, one type may be used alone, or two or more types may be used in combination.

In the above formulae (I) and (II), $R_F$ is a $C_{3-21}$ fluoroalkyl group or fluoroalkenyl group, preferably a $C_{6-10}$ fluoroalkyl group or fluoroalkenyl group. When the number of carbon atoms is at least the lower limit value in the above range, the performance based on fluorine can easily be developed, and when the number of carbon atoms is at most the upper limit value in the above range, the chain length will not be too long, and the polymerization conversion rate is unlikely to decrease.

The proportion of the number of fluorine atoms is preferably at least 50%, more preferably at least 80%, particularly preferably 100%, to the total number of fluorine atoms and hydrogen atoms in the fluoroalkyl group or the fluoroalkenyl group. The fluoroalkyl group and fluoroalkenyl group in which the proportion of the number of the fluorine atoms is 100%, are a perfluoroalkyl group and perfluoroalkenyl group.

Here, a carbon atom at the $R^2$ side terminal of $R^F$ is a carbon atom to which a fluorine atom or a fluoroalkyl group is bonded.

$R^2$ is a $C_{1-10}$ alkylene group having no fluorine atom, and has no fluorine atom. Preferably, it is a $C_{1-4}$ alkylene group. When the number of carbon atoms is at most the upper limit value in the above range, the chain length will not be too long, and the polymerization conversion rate is unlikely to decrease.

$R^3$ is hydrogen or methyl.

Ar is an arylene group which may have a substituent (e.g. a $C_{1-10}$ alkyl group, a hydroxy group, an ester group, a ketone group, an amino group, an amido group, an imido group, a nitro group, a carboxylic acid group, a thiol group, an ether group, etc.). Especially a phenylene group is preferred.

Specific examples of the monomer represented by the above formula (I) may be monomers of the following formulae (a-1) to (a-7), and monomers of structures having —OCOCH=CH$_2$ in such monomers substituted by OCOC(CH$_3$)=CH$_2$.

 (a-1)

 (a-2)

 (a-3)

 (a-4)

 (a-5)

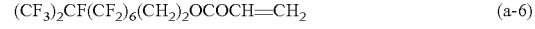 (a-6)

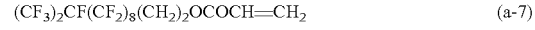 (a-7)

Specific examples of the monomer represented by the above formula (II) may be monomers of the following formulae (f-1) and (f-2), and monomers of structures having —OCOCH=CH$_2$ in such monomers substituted by OCOC(CH$_3$)=CH$_2$.

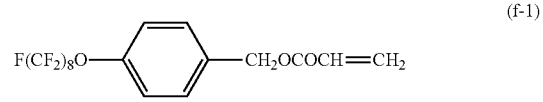 (f-1)

 (f-2)
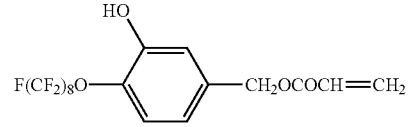

Fluorinated monomers other than the above may, for example, be monomers such as $F(CF_2)_6CH_2OCH=CH_2$, $F(CF_2)_8CH_2OCH=CH_2$, $F(CF_2)_{10}CH_2OCH=CH_2$, $F(CF_2)_6CH_2OCF=CF_2$, $F(CF_2)_8CH_2OCF=CF_2$, $F(CF_2)10CH_2OCF=CF_2$, $F(CF_2)_6CH=CH_2$, $F(CF_2)_8CH=CH_2$, $F(CF_2)_{10}CH=CH_2$, $F(CF_2)_6CF=CF_2$, $F(CF_2)_8CF=CF_2$, $F(CF_2)_{10}CF=CF_2$, $CH_2=CF_2$, $CF_2=CF_2$, etc.

From the viewpoint of imparting excellent water repellency, oil repellency, resistance to adhesion of organisms, to the coating film, as the monomer to be used for units constituting the segment (α), at least one type of the monomer represented by the above formula (I) is preferred.

Among them, at least one member selected from monomers of the above formulae (a-1), (a-2), (a-3), (a-4), (a-6) and (a-7), and monomers of structures having —OCOCH=$CH_2$ in such monomers substituted by OCOC($CH_3$)=$CH_2$, is preferred.

Further, in a case where the segment (α) has a hydroxy group, such a segment (α) may be formed by copolymerizing the above-described fluorinated monomer with a monomer having a hydroxy group being the after-mentioned non-fluorinated monomer.

The segment (α) may have a unit based on a non-fluorinated monomer for the purpose of e.g. adjusting the softening temperature of the segment (α), introducing a crosslinkable group to the segment (α), or improving the affinity to the polymer (A) and adhesion to the substrate.

In a case where the segment (α) has a unit based on a non-fluorinated monomer, as the non-fluorinated monomer, from the viewpoint of maintaining the excellent water repellency, oil-repellency and resistance to adhesion of organisms, while securing the affinity to the polymer (A) and the adhesion to the substrate, an alkyl (meth)acrylate having a $C_{12-20}$ alkyl group (hereinafter referred to also as "a long-chain (meth)acrylate") is preferred. As the non-fluorinated monomer, one type may be used alone, or two or more types may be used in combination.

The long-chain (meth)acrylate may, for example, be dodecyl (meth)acrylate, tridecyl (meth)acrylate, tetradecyl (meth)acrylate, pentadecyl (meth)acrylate, hexadecyl (meth)acrylate, octadecyl (meth)acrylate, or behenyl (meth) acrylate. Among them, hexadecyl (meth)acrylate, octadecyl (meth)acrylate or behenyl (meth)acrylate is particularly preferred.

As the segment (α), from such a viewpoint that it is possible to impart excellent water repellency, oil repellency and resistance to adhesion of organisms, to the coating film and to maintain these properties, a segment composed solely of units based on the above formula (a-2), or a segment composed of units based on the above formula (a-2) and units based on octadecyl (meth)acrylate, is preferred.

In a case where the segment (α) is a segment composed of units based on the above formula (a-2) and units based on octadecyl (meth)acrylate, per 100 mass % in total of these units, it is preferred that the units based on the above formula (a-2) is from 99.9 to 20 mass %, and the units based on octadecyl (meth)acrylate is from 80 to 0.1 mass %, and it is more preferred that the units based on the above formula (a-2) is from 99.5 to 30 mass %, and the units based on octadecyl (meth)acrylate is from 70 to 0.5 mass %.

In the segment (α), the content of fluorine atoms is at least 20 mass %, preferably at least 25 mass %, particularly preferably at least 30 mass %, most preferably at least 50 mass %, to all atoms constituting the segment. If the content is less than the lower limit value in the above range, it may not be possible to impart excellent water repellency, oil repellency and resistance to adhesion of organisms, to the coating film.

The content of units based on a fluorinated monomer, in all units (100 mass %) in the segment (α), is preferably at least 20 mass %, more preferably at least 30 mass %, particularly preferably at least 35 mass %, or may be 100 mass %.

The non-fluorinated monomer includes all of radical polymerizable known monomers having no fluorine atom.

Among them, as the non-fluorinated monomer to constitute the segment (β), from such a viewpoint that it is possible to obtain a sufficient polymerization conversion ratio and to secure the affinity to the polymer (A) and the adhesion to a substrate, without impairing the water repellency, oil repellency and resistance to adhesion of organisms, developed by the polymer (B), a compound of the following formula (III) and other non-fluorinated monomers as exemplified below may be mentioned. As the non-fluorinated monomer, one type may be used alone, or two or more types may be used in combination.

$R^4OCOCR^5=CH_2$     (III)

$R^4$ represents a $C_{1-22}$ alkyl group or alkyl group having a substituent, a $C_{3-15}$ cycloalkyl group or cycloalkyl group having a substituent, or a phenyl group or phenyl group having a substituent, and $R^5$ is a hydrogen atom or a methyl group.

The substituent may, for example, be a $C_{1-10}$ alkyl group, a hydroxy group, an ester group, a ketone group, an amino group, an amido group, an imido group, a nitro group, a carboxylic acid group, a thiol group, an ether group, etc.

Specific examples of the formula (III) include e.g. alkyl (meth)acrylates, such as methyl (meth)acrylate, ethyl (meth) acrylate, n-propyl (meth)acrylate, isopropyl (meth)acrylate, n-butyl (meth)acrylate, isobutyl (meth)acrylate, n-pentyl (meth)acrylate, n-hexyl (meth)acrylate, behenyl (meth)acrylate, 2-ethylhexyl (meth)acrylate, cyclohexyl (meth)acrylate, benzyl (meth)acrylate, etc.; hydroxy group-containing (meth)acrylic acid esters, such as hydroxyethyl (meth)acrylate, diethylene glycol mono(meth)acrylate, polyethylene glycol mono(meth)acrylate, hydroxypropyl (meth)acrylate, dipropylene glycol mono(meth)acrylate, etc.; glycidyl (meth)acrylate; nitrogen-containing (meth)acrylic acid esters, such as dimethylaminoethyl (meth)acrylate, diethylaminoethyl (meth)acrylate, 4-(meth)acryloyloxy-2,2,6,6-tetramethylpiperidine, 4-(meth)acryloylamino-2,2,6,6-tetramethylpiperidine, etc.; monomers such as 2-hydroxy-4-[2-(meth)acryloxyethoxy]benzophenone, 2-hydroxy-[3-(meth) acryloxy-2-hydroxypropoxy]benzophenone, quaternary ammonium salts derived from (meth)acrylic acids, such as quaternary ammonium salts of diethylaminoethyl (meth) acrylate, etc.

Non-fluorinated monomers other than the above may, for example, be nitrogen-containing monomers, such as (meth) acrylamide, N,N-dimethyl (meth)acrylamide, N,N-diethyl (meth)acrylamide, N,N-dipropyl (meth)acrylamide, N,N-diisopropyl (meth)acrylamide, N-isopropyl (meth)acrylamide, N,N-dibutyl (meth)acrylamide, itaconic acid diamide, (meth)acrylonitrile, etc.; sulfonic acid group-containing monomers such as (meth)acrylamide propyl sulfonic acid, acrylamide tert-butyl sulfonic acid, ethyl acrylate sulfonic acid, (meth)allyl sulfonic acid, etc.; carboxylic acid group-containing monomers, such as mono 2-(meth)acryloyloxy-ethyl acid phosphate, (meth)acrylic acid, itaconic acid, crotonic acid, fumaric acid, maleic acid, etc.; aromatic vinyl monomers, such as vinyl pyridine, vinyl benzoate, styrene, α-methylstyrene, methylstyrene, tert-butylstyrene, methoxystyrene, vinyl phenol, styrene sulfonate, etc.; vinyl ester monomers, such as vinyl formate, vinyl acetate, vinyl propionate, vinyl butyrate, vinyl caproate, vinyl dodecylate, vinyl stearate, vinyl 2-ethylhexanoate, etc.; fumaric acid ester monomers, such as diisopropyl fumarate, diisobutyl fumarate, etc.; itaconic acid ester monomers, such as monomethyl itaconate, dimethyl itaconate, monoethyl itaconate, diethyl itaconate, monopropyl itaconate, dipropyl itaconate, monobutyl itaconate, dibutyl itaconate, monoisobutyl itaconate, diisobutyl itaconate, etc.; maleimide-type monomers (monomers having a monovalent group obtained by removing a hydrogen atom bonded to the nitrogen atom of maleimide), such as maleimide, N-methylmaleimide, N-ethylmaleimide, N-propylmaleimide, N-butylmaleimide, N-hexylmaleimide, etc.; vinylnaphthalene, vinylpyrrolidone, N-vinylcaprolactam, butadiene, vinyl chloride, vinylidene chloride, vinylidene cyanide, allyl alcohol, (meth)allyl glycidyl ether, etc.

The polymer (B) preferably has a hydroxy group in the segment (β), as described above. The segment (β) having a hydroxy group preferably has a unit based on a monomer having a hydroxy group. The monomer having a hydroxy group is preferably a hydroxy group-containing vinyl monomer, such as compounds exemplified above as hydroxy group-containing (meth)acrylic acid esters. Among these, hydroxyethyl (meth)acrylate and hydroxypropyl (meth)acrylate are preferred.

As preferred examples of the non-fluorinated monomers other than the hydroxy group-containing vinyl monomers, among the above-mentioned ones, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, dodecyl (meth)acrylate, tridecyl (meth)acrylate, hexadecyl (meth) acrylate, octadecyl (meth)acrylate, behenyl (meth)acrylate, 2-ethylhexyl (meth)acrylate, cyclohexyl (meth)acrylate, benzyl (meth)acrylate, glycidyl (meth)acrylate, (meth)acrylamide, N,N-dimethyl (meth)acrylamide, (meth)acrylic acid, itaconic acid, (meth) acrylonitrile, vinyl acetate, vinyl benzoate and styrene are mentioned.

Further, methyl (meth)acrylate, ethyl (meth)acrylate, n-butyl (meth)acrylate, tertbutyl (meth)acrylate, dodecyl (meth)acrylate, hexadecyl (meth)acrylate, octadecyl (meth) acrylate, 2-ethylhexyl (meth)acrylate, cyclohexyl (meth) acrylate, glycidyl (meth)acrylate, benzyl (meth)acrylate, (meth)acrylamide, N,N-dimethyl (meth)acrylamide, N-methylol (meth)acrylamide, N-(meth)acryloylmorpholine, (meth)acrylic acid, (meth)acrylonitrile, vinyl acetate, styrene, methoxystyrene, N-methylmaleimide, N-ethylmaleimide, N-phenylmaleimide, diisopropyl fumarate, di-tert-butyl fumarate, dicyclohexyl fumarate, dibenzyl fumarate, dim ethyl itaconate, etc. are most preferred.

As the segment (β), from such a viewpoint that a sufficient polymerization conversion ratio can be obtained and, while securing the affinity to the polymer (A) and adhesion to a substrate, water-repellency, oil repellency and resistance to adhesion of organisms developed by the polymer (B) are not impaired, preferred is a segment composed of units based on methyl (meth)acrylate, units based on butyl (meth)acrylate and units based on hydroxyethyl (meth)acrylate, or a segment composed of units based on hydroxyethyl (meth) acrylate and units based on octadecyl (meth)acrylate.

In a case where the segment (β) is a segment composed of units based on methyl (meth)acrylate, units based on butyl (meth)acrylate and units based on hydroxyethyl (meth) acrylate, per 100 mass % in total of these units, it is preferred that units based on methyl (meth)acrylate are from 10 to 50 mass %, units based on butyl (meth)acrylate are from 10 to 50 mass % and units based on hydroxyethyl (meth)acrylate are from 5 to 25 mass %, and it is more preferred that units based on methyl (meth)acrylate are from 25 to 45 mass %, units based on butyl (meth)acrylate are from 20 to 40 mass % and units based on hydroxyethyl (meth)acrylate are from 10 to 20 mass %.

In a case where the segment (β) is a segment composed of units based on hydroxyethyl (meth)acrylate and units based on octadecyl acrylate, per 100 mass % in total of these units, it is preferred that units based on hydroxyethyl (meth) acrylate are 0.1 to 50 mass % and units based on octadecyl (meth)acrylate are from 50 to 99.9 mass %, and it is more preferred that units based on hydroxyethyl (meth)acrylate are from 0.5 to 40 mass % and units based on octadecyl (meth)acrylate are from 60 to 99.5 mass %.

In the segment (β), the content of fluorine atoms is preferably at most 10 mass %, more preferably at most 5 mass %, or it may be 0 mass %, to all atoms (100 mass %) constituting the segment. If it is at most the upper limit value in the above range, the affinity to the polymer (A) and adhesion to the substrate will be excellent. Further, the water repellency, oil repellency and resistance to adhesion of organisms will also be less likely to decrease.

The difference in the numerical value of the content of fluorine atoms represented by mass % between in the segment (α) and the segment (β) is at least 10. That is, when the content of fluorine atoms in all atoms (100 mass %) in the segment (α) is represented by X mass %, and the content of fluorine atoms in all atoms (100 mass %) in the segment (β) is represented by Y mass %, X-Y is at least 10.

X-Y is preferably at least 30, more preferably at least 50.

By changing the type of units or the proportion of units in the segment (α) and the segment (β), it is possible to adjust the functions of the polymer (B).

The proportion of units based on the non-fluorinated monomer in all units (100 mass %) in the segment (β) is preferably at least 50 mass %, more preferably at least 65 mass %, particularly preferably at least 80 mass %, or may be 100 mass %.

The proportion of units based on the hydroxy group-containing vinyl monomer in all units (100 mass %) in the polymer (B), is preferably from 2 to 35 mass %, more preferably from 5 to 30 mass %, particularly preferably from 5 to 20 mass %. When it is at least the lower limit value in the above range, the coating film will be sufficiently cured, and the formed coating film can sufficiently maintain its properties. The proportion of such units may exceed the upper limit value in the above range, but even if it exceeds, the effect to sufficiently cure the coating film, or the effect to sufficiently maintain the properties of the coating film, will not be improved any further.

The hydroxy value of the polymer (B) is, for the same reason, preferably from 10 to 100 mgKOH/g, more preferably from 15 to 90 mgKOH/g, particularly preferably from 45 to 65 mgKOH/g.

The proportion of the segment (α) in the polymer (B) is preferably from 5 to 90 mass %, more preferably from 10 to 80 mass %, particularly preferably from 15 to 70 mass %, most preferably 20 to 60 mass %. When the segment (α) is at least the lower limit value in the above range, it is possible to impart sufficient water repellency, oil repellency and resistance to adhesion of organisms, to the coating film. When it is at most the upper limit value in the above range, the affinity to the polymer (A) and the adhesion to a substrate will be excellent, whereby the water repellency, oil repellency and resistance to adhesion of organisms, of the coating film, will be sufficiently maintained.

The number average molecular weight (Mn) of the polymer (B) is preferably from 5,000 to 100,0000, more preferably from 10,000 to 300,000, particularly preferably from 10,000 to 100,000. When it is at least the lower limit value in the above range, the coating film formed is able to sufficiently exhibit the performance based on fluorine. When it is at most the upper limit value in the above range, it is possible to produce the polymer (B) without any problem.

The polymer (B) can be produced by using a polymeric peroxide as a polymerization initiator. The polymeric peroxide is a compound having two or more peroxy bonds in one molecule, and one or more of various polymeric peroxides disclosed in JP-B-05-59942 may be used.

The polymer (B) can be produced by using the polymeric peroxide by a conventional bulk polymerization method, suspension polymerization method, solution polymerization method, emulsion polymerization method or the like.

In the case of a solution polymerization method, for example, as a first step, by polymerizing a non-fluorinated monomer containing a hydroxy group-containing vinyl monomer in a solution using a polymeric peroxide as a polymerization initiator, a peroxy bond-containing non-fluorinated polymer (segment (β)) having peroxy bonds introduced in the chain, is obtained. Then, in a second step, into the solution obtained in the first step, a fluorinated monomer is added and polymerized, whereby the peroxy bonds of the peroxy bond containing non-fluorinated polymer are cleaved, and a segment (α) is formed. Thus, it is thereby possible to obtain the polymer (B) at high efficiency.

Here, in the two-stage polymerization as described above, the polymer (B) may be obtained by using the non-fluorinated monomer of the first step in the second step, and the fluorinated monomer of the second step in the first step.

(Resin (C))

The composition of powder coating material of the present invention may contain a resin (C) which does not belong to either the polymer (A) or the polymer (B) and which is other than the polymers (A) and (B).

As the resin (C), preferred is at least one non-fluorinated resin selected from an acrylic resin, a polyester resin, a polyurethane resin, an epoxy resin and a silicone resin.

As the resin (C), when a polyester resin is used, a coating film excellent in processability and impact resistance tends to be obtainable, when an acrylic resin is used, a coating film excellent in weather resistance and abrasion resistance and having a high gloss tends to be obtainable, and when an epoxy resin is used, a coating film excellent in chemical resistance and excellent also in corrosion resistance and rust resistance, tends to be obtainable. As the resin (C), when a polyurethane resin is used, in a case where a sealing material is formed on the coating film, a coating film excellent in adhesion to the sealing material and excellent in processability, tends to be obtainable, and when a silicone resin is used, a coating film excellent in resistance to stain such as graffiti, tends to be obtainable.

<Acrylic Resin>

An acrylic resin is a polymer having (meth)acrylate units. The acrylic resin may be one having reactive functional groups such as carboxy groups, hydroxy groups or sulfo groups.

The glass transition temperature of the acrylic resin is preferably from 30 to 60° C. When the glass transition temperature is at least the above lower limit value, the coating film is less likely to undergo blocking. When the glass transition temperature of the acrylic resin is at most the above upper limit value, the surface smoothness of the coating film will be further excellent.

The number-average molecular weight of the acrylic resin is preferably from 5,000 to 100,000, particularly preferably from 30,000 to 100,000. When the number-average molecular weight of the acrylic resin is at least the above lower limit value, the coating film is less likely to undergo blocking. When the number average molecular weight of the acrylic resin is at most the above upper limit value, the surface smoothness of the coating film will be further improved.

The mass average molecular weight of the acrylic resin is preferably from 6,000 to 150,000, more preferably from 40,000 to 150,000, particularly preferably from 60,000 to 150,000. When the mass average molecular weight of the acrylic resin is at least the above lower limit value, the coating film is less likely to undergo blocking. When the mass average molecular weight of the acrylic resin is at most the upper limit value, the surface smoothness of the coating film will be further excellent.

In a case where the acrylic resin has carboxy groups, the acid value of the acrylic resin is preferably from 0.1 to 300 mgKOH/g. When the acid value of the acrylic resin is at least the above lower limit value, at the time of blending a pigment, etc. to the powder coating material, there will be the dispersion improving effect. When the acid value of the acrylic resin is at most the above upper limit value, the coating film will be excellent in moisture resistance. In a case where the acrylic resin has hydroxy groups, the hydroxy value of the acrylic resin is, from the viewpoint of adhesion to a substrate, preferably from 1 to 250 mgKOH/g.

Here, the acid value is measured in accordance with JIS K 0070:1992, or JIS K 5601-2-1:1999.

<Polyester Resin>

The polyester resin may be one having polybasic carboxylic acid units and polyhydric alcohol units, and as the case requires, units other than these two units (for example, hydroxycarboxylic acid units, etc.).

A linear polyester resin is, except for the terminal units, composed only of divalent units, such as divalent units derived from a polybasic carboxylic acid, and divalent units derived from a polyhydric alcohol. A branched polyester resin has at least one trivalent or higher valent unit, and, except for such trivalent or higher valent unit and terminal units, it is composed substantially only of divalent units.

As the polyester resin, a linear polymer or a branched polymer having a small number of branches, is preferred, and a linear polymer is particularly preferred. If a branched polymer has many branches, the softening point or the melting temperature tends to be high, and therefore, if a polyester resin is a branched polymer, the softening point is preferably at most 200° C. As the polyester resin, preferred is a polyester resin which is solid at ordinary temperature and has a softening point of from 100 to 150° C.

The number-average molecular weight of the polyester resin is preferably at most 5,000, from such a viewpoint that the melt viscosity of the coating film can thereby be made to be suitable low. The mass average molecular weight of the polyester resin is preferably from 2,000 to 20,000, particularly preferably from 2,000 to 10,000, from such a viewpoint that the melt viscosity of the coating film can thereby be made to be suitable low. As the polyester resin, more preferred is one having a number average molecular weight of at most 5,000 and a mass average molecular weight of from 2,000 to 20,000, and particularly preferred is one having a number average molecular weight of at most 5,000 and a mass average molecular weight of from 2,000 to 10,000.

The polyester resin may have a crosslinkable group capable of reacting with a curing agent. At least a portion of a terminal unit of the polymer chain of the polyester resin is preferably a monovalent polybasic carboxylic acid unit or a monovalent polyhydric alcohol unit, so that in the former case, a free carboxy group in the unit, or in the latter case, a free hydroxy group in the unit, will function as a crosslinkable group. The unit having a crosslinkable group may be a unit other than a terminal unit. For example, since a divalent polyhydric alcohol unit derived from a polyhydric alcohol having at least three hydroxy groups, is a unit having a free hydroxy group, a polyester resin may have a divalent or higher valent unit having such a crosslinkable group.

As the crosslinkable group in the polyester resin, a hydroxy group is preferred, from the viewpoint of excellent water resistance, alkali resistance and acid resistance of the coating film. A polyester resin usually has hydroxy groups and carboxy groups, and as the polyester resin, preferred is a polyester resin having mainly hydroxy groups.

The hydroxy value of the polyester resin is preferably from 20 to 100 mgKOH/g, particularly preferably from 20 to 80 mgKOH/g. The acid value of the polyester resin is preferably from 0.5 to 80 mgKOH/g, particularly preferably from 0.5 to 50 mgKOH/g.

As the polyester resin, from the viewpoint of excellent impact resistance of the coating film, and excellent dispersibility of a pigment, etc. when such a pigment, etc. are incorporated into the powder coating material, preferred is a polyester resin having units derived from a $C_{8-15}$ aromatic polybasic carboxylic acid and units derived from a $C_{2-10}$ polyhydric alcohol.

As the polybasic carboxylic acid units, preferred are units derived from a $C_{8-15}$ aromatic polybasic carboxylic acid. The $C_{8-15}$ aromatic polybasic carboxylic acid is a compound having an aromatic ring and two or more carboxy groups, and the carboxy groups are attached to carbon atoms of an aromatic ring. Otherwise, it may be an anhydride having a structure wherein two carboxy groups are dehydrated.

As the aromatic ring, a benzene ring or a naphthalene ring is preferred, and a benzene ring is particularly preferred. In the case of the benzene ring, two may be present in one molecule.

The number of carboxy groups in the aromatic polybasic carboxylic acid is preferably 2 to 4, particularly preferably 2.

As the polybasic carboxylic acid units, from the viewpoint of excellent weather resistance of the coating film, isophthalic acid units are preferred.

As the polyhydric alcohol units, preferred are units derived from a $C_{2-10}$ polyhydric alcohol. The $C_{2-10}$ polyhydric alcohol is a compound having two or more hydroxy groups. As the polyhydric alcohol, an aliphatic polyhydric alcohol or an alicyclic polyhydric alcohol is preferred, and an aliphatic polyhydric alcohol is particularly preferred. The number of hydroxy groups in the polyhydric alcohol is preferably from 2 to 4, particularly preferably 2.

As the polyhydric alcohol units, from the viewpoint of excellent adhesion to the substrate, and being excellent also in flexibility so that even when a heat history (thermal cycling) is exerted, heat resistance of the powder coating film is excellent, preferred are units derived from a $C_{3-8}$ polyhydric alcohol, and particularly preferred are units derived from a $C_{4-6}$ polyhydric alcohol.

<Epoxy Resin>

As the epoxy resin, a bisphenol A type epoxy resin or a bisphenol F type epoxy resin may be mentioned.

<Polyurethane Resin, Silicone Resin>

As the polyurethane resin and the silicone resin, respectively known resins may be used.

(Curing Agent)

In a case where resin components contained in the powder coating material have crosslinkable groups, a curing agent is incorporated to the powder coating material, so that it will be reacted with the crosslinkable groups, to crosslink the resin components or to increase the molecular weight, for curing.

The curing agent has two or more crosslinkable groups reactive with crosslinkable groups (hydroxy groups, carboxy groups, etc.) contained in the resin components.

As crosslinkable groups of the curing agent, ones reactive at room temperature with crosslinkable groups of the resin components are not desirable, and therefore, crosslinkable groups which can be reacted at the time when the powder coating material is melt-kneaded, are preferred. For example, blocked isocyanate groups are preferred rather than isocyanate groups having a high crosslinkability at room temperature. When the powder coating material is melt-kneaded, blocked isocyanate groups will become isocyanate groups, as the blocking agent is removed, and the isocyanate groups will act as crosslinkable groups.

As the curing agent, it is possible to use a known compound, and for example, a blocked isocyanate-type curing agent, an amine type curing agent (a melamine resin, a guanamine resin, a sulfonamide resin, a urea resin, an aniline resin, etc. having an amino group to which a hydroxymethyl group or alkoxymethyl group is bonded), a β-hydroxyalkylamide-type curing agent, or an epoxy-type curing agent (triglycidyl isocyanurate, etc.) may be mentioned. Particularly preferred is a blocked isocyanate-type curing agent from the viewpoint of excellent adhesion to a substrate, the processability of a product after formation of the coating film, and excellent water resistance of the coating film.

In a case where the polymer (A1) is a polymer having carboxy groups formed by a method of reacting an acid anhydride to hydroxy groups of the original polymer, as the curing agent, a β-hydroxyalkylamide-type curing agent or an epoxy-type curing agent is preferred.

As the curing agent, one type may be used alone, or two or more types may be used in combination.

The blocked isocyanate-type curing agent is preferably one which is solid at room temperature.

The blocked isocyanate-type curing agent is preferably one produced by reacting an aliphatic, aromatic or aliphatic diisocyanate with a low molecular weight compound having active hydrogen, to obtain a polyisocyante, which is then reacted with a blocking agent, for masking.

The diisocyanate may, for example, be tolylene diisocyanate, 4,4'-diphenylmethane diisocyanate, xylylene diisocyanate, hexamethylene diisocyanate, 4,4'-methylenebis (cyclohexyl isocyanate), methylcyclohexane diisocyanate, bis (isocyanatomethyl) cyclohexane, isophorone diisocyanate, dimer acid diisocyanate, lysine diisocyanate, etc.

The low molecular compound having active hydrogen may, for example, be water, ethylene glycol, propylene glycol, trimethylolpropane, glycerine, sorbitol, ethylenediamine, ethanolamine, diethanolamine, hexamethylenediamine, isocyanurate, uretdione, a low molecular weight polyester having a hydroxy group, polycaprolactone, etc.

The blocking agent may, for example, be an alcohol (methanol, ethanol, benzyl alcohol, etc.), a phenol (phenol, cresol, etc.), a lactam (caprolactam, butyrolactam, etc.), an oxime (cyclohexanone, oxime, methyl ethyl ketoxime, etc.).

(Curing Catalyst)

The composition for powder coating material may contain a curing catalyst as the case requires. The curing catalyst is one to promote a curing reaction and to impart good chemical properties and physical properties to the coating film.

In a case where a blocked isocyanate-type curing agent is used, the curing catalyst is preferably a tin catalyst (tin octylate, tributyltin laurate, dibutyltin dilaurate, etc.).

As the curing catalyst, one type may be used alone, or two or more types may be used in combination.

(Other Components)

The powder coating material may contain, as other components, an ultraviolet absorber, and one or more of various additives such as a pigment, etc., as the case requires.

As the ultraviolet absorber, any ultraviolet absorber selected from organic ultraviolet absorbers and inorganic ultraviolet absorbers, may be used.

As the ultraviolet absorber, one type may be used alone, or two or more types may be used in combination.

The various additives may, for example, be a light stabilizer (a hindered amine light stabilizer, etc.), a matting agent (ultrafine synthetic silica, etc.), a surfactant (a nonionic surfactant, a cationic surfactant or an anionic surfactant), a leveling agent, a surface modifier (to improve the surface smoothness of the coating film), a degassing agent (having an effect to discharge out of the coating film air included in the powder, gas, moisture, etc. from the curing agent, so that they will not remain inside the coating film, and it is usually solid, but when melted, becomes to have a very low viscosity), a filler, a heat stabilizer, a thickener, a dispersing agent, an antistatic agent, a rust inhibitor, a silane coupling agent, an antifouling agent, a low-pollution treatment agent, a pigment, etc.

As the pigment, at least one member selected from the group consisting of bright pigments, anticorrosive pigments, coloring pigments and extender pigments, is preferred.

(Content of Each Component)

The content of the polymer (B) in the composition for powder coating material is preferably from 0.1 to 100 parts by mass, more preferably from 2 to 80 parts by mass, particularly preferably from 3 to 60 parts by mass, to 100 parts by mass of the polymer (A). When the content of the polymer (B) is at least the lower limit value in the above range, the coating film will be excellent in water repellency, oil repellency and resistance to adhesion of organisms. When it is at most the upper limit value in the above range, a problem that the adhesive of a sealing material or the like tends to hardly adhere during construction of the substrate will be unlikely to occur.

However, in a case where the composition for powder coating material contains a resin (C), the content of the polymer (B) is preferably from 0.1 to 100 parts by mass, more preferably from 2 to 80 parts by mass, particularly preferably from 3 to 60 parts by mass, to 100 parts by mass in total of the polymer (A) and the resin (C). When the content of the polymer (B) is at least the lower limit value in the above range, the coating film will excellent in water repellency, oil repellency and resistance to adhesion of organisms. When it is at most the upper limit value in the above range, a problem that the adhesive of a sealing material or the like tends to hardly adhere during construction of the substrate will be unlikely to occur.

When the composition for powder coating material contains a resin (C), the mass ratio of the polymer (A) to the resin (C) i.e. ((A)/(C)) is preferably from 90/10 to 10/90, more preferably from 85/15 to 15/85, particularly preferably from 80/20 to 20/80. When the mass ratio is within the above range, the weather resistance of the coating film to be formed, will be excellent, and at the same time, it is possible to reduce the cost of the coating film.

In a case where the composition for powder coating material contains a curing agent, its amount may be suitably set. For example, the content of the curing agent in the composition for powder coating material is preferably from 1 to 50 parts by mass, particularly preferably from 3 to 30 parts by mass, to 100 parts by mass in total of the polymer (A1) and the polymer (B) in the composition for powder coating material.

In a case where the curing agent is a blocked isocyanate-type curing agent, the content of the blocked isocyanate-type curing agent in the composition for powder coating material is preferably such an amount that the molar ratio of isocyanate groups to hydroxy groups in the composition for powder coating material will be from 0.05 to 1.5, particularly preferably such an amount that the molar ratio will be from 0.8 to 1.2. When the molar ratio is at least the above lower limit value, the degree of curing of the coating material will be high, and the coating film will be excellent in the hardness, chemical resistance, etc. When the molar ratio is at most the above upper limit value, the coating film will be less likely to become brittle, and moreover, the coating film will be excellent in the heat resistance, chemical resistance, moisture resistance, etc.

In a case where the composition for powder coating material contains a curing catalyst, its amount may be suitably set. For example, the content of the curing catalyst in the composition for powder coating material is preferably from 0.0001 to 10.0 parts by mass, to 100 parts by mass in total of the polymer (A1) and the polymer (B) in the composition for powder coating material. When the content of the curing catalyst is at least the above lower limit value, the catalytic effect tends to be sufficiently obtainable. When the content of the curing catalyst is at most the above upper limit value, a gas such as air included in the powder coating material during the melting and curing process of the powder coating material, tends to be easily discharged, whereby deterioration in the heat resistance, weather resistance and water resistance of the coating film caused by remaining gas, tends to be less likely.

In a case where the composition for powder coating material contains a pigment, its amount may be suitably set. For example, the content of the pigment in the composition for powder coating material is preferably from 20 to 200 parts by mass, particularly preferably from 50 to 150 parts by mass, to 100 parts by mass in total of the polymer (A) and the polymer (B) in the composition for powder coating material.

In a case where a ultraviolet absorber and various additives such as a pigment, etc., are contained in the composition for powder coating material, their total amount is preferably controlled to be within such a range that the sum of the polymer (A) and the polymer (B) to the total amount of the composition for powder coating material would be at least 30 mass %.

[Method for Producing Composition for Powder Coating Material]

The composition for powder coating material may be produced by a known method.

Specifically, by mixing the polymer polymer (A) and the polymer (B), and, as optional components, the resin (C), a curing agent, a curing catalyst and various additives, by e.g. a high-speed mixer, a V-type mixer, an inversion mixer, etc., a composition for powder coating material is obtainable. It is preferred that each component is previously pulverized into a powder form.

The obtained composition for powder coating material is melt-kneaded by e.g. a monoaxial extruder, a biaxial extruder, a planetary gear or the like, and the kneaded product obtained by the melt-kneading is pulverized by a pulverizer such as a pin mill, a hammer mill or a jet mill. Thereafter, if necessary, the pulverized product thus obtained is classified. Thus, it is possible to obtain a powder composed of the composition for powder coating material. It is preferred that the kneaded product is, after cooling, pelletized into pellets.

[Powder Coating Material]

The powder coating material of the present invention comprises a powder composed of the composition for powder coating material of the present invention. The powder coating material of the present invention contains the powder composed of the composition for powder coating material of the present invention preferably in an amount of at least 50 mass %, more preferably in an amount of at least 70 mass %, or it may be one composed of 100 mass % of the powder.

Components other than the powder composed of the composition for powder coating material of the present invention, may, for example, be at least one of other components as exemplified above as components which may be contained, as the case requires, in the composition for powder coating material of the present invention.

[Coated Article]

The coated article of the present invention is one having a coating film made of the powder coating material of the present invention, on the surface of a substrate, and can be formed by a method of applying the powder coating material of the present invention on a substrate, to form a coating film in a molten state, consisting of a melt of the powder coating material, and cooling the same. In a case where components in the powder coating material have a reactivity, a curing reaction will take place.

The coating film in a molten state, consisting of a melt of the powder coating material, may be formed at the same time as the powder coating material is applied to the substrate, or may be formed, after depositing the powder coating material to a substrate, by heat-melting it on the substrate.

In a case where the powder coating material has a reactivity, substantially at the same time as the powder coating material is heat-melted, a curing reaction of the reactive components will start, and therefore, it is necessary to conduct the heat-melting of the powder coating material and the adhesion to the substrate substantially at the same time, or to conduct the heat-melting of the powder coating material after depositing the powder coating material on the substrate.

The material for the substrate may, for example, be a metal such as aluminum, iron, zinc, tin, titanium, lead, special steel, stainless steel, copper, magnesium, brass, etc. and may be suitably selected depending upon the application of the coated article. The substrate may be one containing two or more types of the exemplified metals.

As the material for the substrate, aluminum is preferred from the viewpoint of being light in weight and excellent in corrosion resistance and strength.

The shape, size, etc. of the substrate are not particularly limited.

The coating method may, for example, be an electrostatic coating method, an electrostatic spraying method, an electrostatic immersion method, a misting method, a flow immersion method, a spraying method, a thermal spraying method, a plasma spraying method, etc. From such a viewpoint that even when the coating film is thinned, surface smoothness of the coating film is excellent, and further, that the coating film is excellent in hiding properties, an electrostatic coating method using a powder coating gun is preferred.

The coating film in a molten state is cooled to room temperature (20 to 25° C.) to form a coating film on the substrate.

The cooling may be either quenching or annealing.

The thickness of the coating film is preferably from 20 to 1,000 μm, more preferably from 20 to 500 μm, particularly preferably from 20 to 300 μm, but it may be suitably set depending on e.g. the weather resistance required for the coating film.

The water contact angle of the coating film is preferably from 95 to 160°, more preferably from 96 to 150°, particularly preferably from 97 to 140°. When the water contact angle is at least the lower limit value in the above range, the water repellency will be excellent. When it is at most the upper limit value in the above range, a problem that the adhesive of the sealing material or the like tends not to adhere during construction of the substrate will be unlikely to occur.

The contact angle of hexadecane of the coating film is preferably from 20 to 80°, more preferably from 30 to 75°, particularly preferably from 40 to 70°. When the contact angle is at least the lower limit value in the above range, the oil repellency will be excellent. When it is at most the upper limit value in the above range, a problem that the adhesive of a sealing material or the like tends not to adhere during construction of the substrate will be unlikely to occur.

The coating film formed from the powder coating material containing a powder composed of the composition for powder coating material of the present invention, maintains the water repellency and oil repellency even if the surface is rubbed, or even if it is provided in an environment in contact with water, and it is excellent also in resistance to adhesion of organisms whereby mold and algae are less likely to adhere. Therefore, specific applications of the coated article having such a coating film include, e.g. plumbing wall material for kitchen, bathroom, wash room, toilet, etc., surface material for storage furniture such as a cupboard, etc., road signs such as traffic lights, etc., exterior members for construction such as an aluminum composite panel, an aluminum panel curtain wall, an aluminum frame for curtain wall, an aluminum window frame, etc., exterior members for e.g. oil tanks, natural gas tanks, ceramic building materials, housing exterior materials, automobile parts, aircraft members, railway vehicle members, solar cells back seat members, wind power towers, wind power blades, etc.

EXAMPLES

Hereinafter, the present invention will be described in detail with reference to Examples, but the present invention is not limited to these Examples.

In the following Examples, Ex. 1 to 5 are Examples of the present invention, and Ex. 6 to 8 are Comparative Examples.

[Various Evaluation Methods]

(Copolymerization Composition of Fluorocopolymer)

Obtained by $^1$H-NMR and $^{13}$C-NMR.

(Glass Transition Temperature (Tg))

The glass transition temperature (Tg) is a value measured by a differential calorimeter (DSC).

(Number Average Molecular Weight (Mn) and Mass Average Molecular Weight (Mw))

The number average molecular weight (Mn) and the mass average molecular weight (Mw) are values obtained as calculated as polystyrene by a gel permeation chromatography (GPC) method.

(Hydroxy Value)

Measured in accordance with JIS K 0070:1992.

Production Example 1

Production of Fluorinated Copolymer

Into a stainless steel autoclave equipped with a stirrer having an inner volume of 250 mL, 51.2 g of cyclohexyl vinyl ether (CHVE), 13.3 g of hydroxybutyl vinyl ether (HBVE), 55.8 g of xylene, 15.7 g of ethanol, 1.1 g of potassium carbonate, 0.7 g of a 50 mass % xylene solution of tert-butyl peroxypivalate (PBPV) and 63 g of chlorotrifluoroethylene (CTFE) were introduced. Then, the temperature was gradually raised, and after reaching 55° C., it was held for 20 hours. Then, the temperature was raised to 65° C. and kept for 5 hours. Then, after cooling, the residue was removed by filtration to obtain 119.9 g of a fluorinated copolymer having hydroxy groups. The obtained fluorinated copolymer having hydroxy groups is a polymer within the scope of the polymer (A1) in the present invention. This fluorinated copolymer will be hereinafter referred to as "polymer (A1-1)".

The copolymer composition of the polymer (A1-1) was CTFE units/HBVE units/CHVE units=50.0/11.0/39.0 (mol %). Further, the polymer (A1-1) had Tg of 54° C., Mn of 12,000 and a hydroxy value of 51.3 mgKOH/g.

Production Example 2

Production of Polymer for Comparison

Into a reactor equipped with a thermometer, a stirrer and a reflux condenser, 100 g of 2-butanone was charged, and heated to 65° C., while blowing nitrogen gas. Thereto, a mixture composed of 93 g of 2-butanone, 25.0 g of methyl methacrylate, 15.0 g of butyl methacrylate, 8.0 g of 2-hydroxyethyl methacrylate, 50.0 g of $CH_2$=$CHCOO(CH_2)_2$ $(CF_2)_7CF_3$ and 2.0 g of t-butyl peroxypivalate, was charged over a period of 2 hours, followed by a polymerization reaction at 75° C. for 8 hours, to obtain a fluorinated random copolymer having hydroxy groups. Mn of the obtained fluorinated random copolymer was 15,000.

The obtained fluorinated random copolymer is a polymer having the same unit structure as the polymer (B) in the present invention, but not a copolymer having a block structure. The obtained fluorinated random copolymer will be hereinafter referred to as "polymer (BX-1)".

Production Example 3

Production of Acrylic Resin

In a four-necked flask having an inner volume of 1 liter and equipped with a condenser and a thermometer, 200 mL of deionized water, 2 g of a reactive emulsifier JS2 of succinic acid ester derivative (Sanyo Chemical Industries, Ltd.) and 2 g of polyoxyethylene nonylphenyl ether (EO 10) were added, and when the temperature reached 80° C. in a warm bath under a nitrogen stream, 20 mL of a 2 mass % aqueous solution of ammonium persulfate was added, and then, a mixture of 140.2 g of methyl methacrylate, 80.0 g of ethyl methacrylate and 0.2 g of n-lauryl mercaptan as a chain transfer agent, was dropwise added over a period of 1 hour. Immediately thereafter, 2 mL of a 2 mass % aqueous solution of ammonium persulfate was added to initiate the reaction. After 3 hours, the vessel inside temperature was raised to 85° C. and held for 1 hour, followed by filtration through a 300-mesh metal gauze to obtain a bluish white aqueous dispersion. The obtained aqueous dispersion was freeze-coagulated at −25° C., and after dehydration washing, vacuum dried at 80° C., to obtain 209.2 g of a MMA-type copolymer (white powder). The obtained MMA copolymer had Tg of 56.6° C., a mass average molecular weight (Mw) of 92,000 and a number-average molecular weight (Mn) of 43,000.

The obtained MMA copolymer will be hereinafter referred to as resin (C-2).

[Components Used in Production of Composition for Powder Coating Material]

<PVDF>

The commercially available following PVDF was obtained and used. Hereinafter, this PVDF will be referred to as "PVDF-1".

Product name "PVDF DS203" (manufactured by SHENZHOU NEWMATERIAL CO, LTD (Dongyue, Inc.))

Mass average molecular weight (Mw): 270,000
Number-average molecular weight (Mn): 160,000
Melting point: 170° C.

<Polymer (B)>

The commercially available following fluorinated block copolymer was obtained and used. Hereinafter, this block copolymer will be referred to as "polymer (B-1)".

Product name "Modiper (registered trademark) F606" (manufactured by NOF Co., Ltd.)

Hydroxy value: 55 mgKOH/g

Segment (α): 100 mass % of $CH_2$=$CHCOO(CH_2)_2$ $(CF_2)_5CF_3$ units (The content of fluorine atoms is 57.2 mass % to all atoms constituting the segment (α)).

Segment (β): methyl methacrylate/n-butyl methacrylate/ 2-hydroxyethyl methacrylate=38.8/43.2/18.0 (mass ratio) (The content of fluorine atoms is 0 mass % to all atoms constituting the segment (β)).

Segment (α)/segment (β)=28.5/71.5 (mass ratio). (However, the polymer (B-1) has a moiety based on the polymerization initiator, and segment (α)/segment (β)/moiety based on the polymerization initiator=28.0/71.0/1.0 (mass ratio)).

<Polyester Resin>

The commercially available following polyester resin was obtained and used. Hereinafter, this polyester resin will be referred to as "resin (C-1)".

Product name "CRYLCOAT (registered trademark) 4890-0" (manufactured by Daicel Allnex Ltd., constituting units (molar ratio): isophthalic acid/neopentyl glycol=49/51)

Mass average molecular weight (Mw): 4,400
Number average molecular weight (Mn): 2,500
Hydroxy value: 30 mgKOH/g <Curing Agent>

Blocked isocyanate-type curing agent (manufactured by Evonik "Vestagon (registered trademark) B1530"). Hereinafter, this curing agent will be referred to as "curing agent-1".

<Curing Catalyst>

A xylene solution of dibutyltindilaurate (10,000-fold diluted product). Hereinafter, this curing catalyst will be referred to as "curing catalyst-1".

(Additives)

Titanium oxide pigment: Ti-Pure R960 (trade name, manufactured by DuPont, titanium oxide content: 89 mass %)

Degassing agent: benzoin

Surface control agent: manufactured by BYK-Chemie GmbH, trade name: BYK-360P

Ex. 1 to 8

All components shown in Table 1 were mixed for about from 10 to 30 minutes by using a high speed mixer (manufactured by Yusaki Co., Ltd.) to obtain a powdery mixture (a composition for powder coating material). The (powder coating composition) was melt-kneaded by means of a twin-screw extruder (manufactured by Thermoprism, 16 mm extruder) at a barrel setting temperature of 120° C., to obtain pellets. The pellets were pulverized at room temperature by means of a pulverizer (manufactured by FRITSCH, product name: Rotor Speed Mill P 14) and classified by 150 mesh, to obtain a powder composed of a composition for powder coating material having an average particle size of about 40 µm.

However, only in Ex. 5 using PVDF, the barrel setting temperature was 200° C. instead of 120° C., and pulverization of the pellets was carried out by a freeze drying method using dry ice.

The average particle size of the powder composed of the composition for powder coating material is a value measured by a laser diffraction particle size distribution analyzer (manufactured by Sympatec Inc., product name: Helos-Rodos) and obtained by the 50% average volume particle size distribution.

Using the obtained powder composed of the composition for powder coating material, a cured film (a coating film) was obtained as described below, and various evaluations were conducted. The results are shown in Table 1.

In Table 1, "Amount of polymer (B-1) (parts by mass)" is meant for the amount of the polymer (B-1) to 100 parts by mass in total of the polymer (A1-1) and PVDF-1.

(Evaluation of Coating Film)

<Preparation of Test Specimen>

Using the above powder coating material, electrostatic coating was made on one surface of a chromate treated aluminum plate (substrate) by means of an electrostatic coating machine (manufactured by Onoda Cement Co. Ltd., trade name: GX3600C), held for 20 minutes in a 200° C. atmosphere, and then left to cool to room temperature, to obtain an aluminum plate with a cured film having a thickness of from 55 to 65 µm. The obtained cured film-coated aluminum plate was used as a test specimen and subjected to the following tests. The results are shown in Table 1.

However, only in Ex. 5 using PVDF, the holding temperature was set to be 250° C. instead of 200° C.

<Contact Angle of Coating Film (Water)>

The contact angle at the time when a liquid droplet of water was dropped on the coating film in air, was measured by using a contact angle meter (manufactured by Kyowa Interface Science Co., Ltd., CA-X type). The larger the contact angle, the better the water repellency.

1. Initial Water Contact Angle

The water contact angle of the coating film of the test specimen was measured in air and judged by the following standards.

○ (good): The contact angle was from 95° to 160° x (bad): The Contact Angle was less than 95°

2. Water Contact Angle After Immersion in Water

In accordance with JIS K 5600-6-2, the test specimen was immersed for two weeks in ion-exchanged water at 25° C. Thereafter, the test specimen was taken out and dried at room temperature for 24 hours, whereupon the water contact angle of the coating film was measured in air and judged by the following standards.

○ (good): The contact angle was from 95° to 160° x (bad): The contact angle was less than 95°

3. Water Contact Angle After Wiping

The surface of the coating film of the test specimen was rubbed with a cotton swab by reciprocating the cotton swab 30 times. Then, the water contact angle of the coating film was measured in air and judged by the following standards.

○ (good): The contact angle was from 95° to 160° x (bad): The contact angle was less than 95°

<Initial Contact Angle of Coating Film (Hexadecane)>

Using the above contact angle meter, the contact angle of the coating film of the test specimen (hexadecane) was measured in air and judged by the following standards. The larger the contact angle, the better the oil repellency.

○ (good): The contact angle was from 20° to 80° x (bad): The contact angle was less than 20°

<Stain Resistance (1)>

A liquid having 10 g of instant coffee (manufactured by AGF Inc., trade name: Blendy) and 10 g of Creap (manufactured by Morinaga Milk Industry Co., Ltd., trade name: Creap) dissolved in 80 g of hot water at 90° C., was cooled to 50° C., and then, 10 droplets of this liquid were placed on the coating film side of the test specimen, covered with a watch glass and allowed to stand for one week. Then, the test specimen was washed with ion exchange water and dried, whereupon the state of the coating film surface was visually observed and evaluated by the following standards.

⊚: No stain

○: Slight stain

Δ: Considerable stain x: Strong stain

<Stain Resistance (2)>

10 g of carbon powder (manufactured by Mitsubishi Chemical Co., Ltd., trade name "MA100") was diluted with 90 g of deionized water, and using glass beads, dispersed and mixed.

The obtained carbon dispersion was dropped by a dropper on the coating film surface of the test specimen, so as to be about 50 g/m², and heated and dried at 50° C. for 2 hours.

While exposing it to flowing water, the test specimen after drying was wiped with a brush and washed. The state of the coating film surface was visually observed and evaluated by the following standards.

⊚: No stain

○: Slight stain

Δ: Considerable stain x: Strong stain

<Resistance to Adhesion of Organisms>

Outdoors in Naha-City, Okinawa Prefecture, a coating film-coated aluminum plate was installed, and the degree of occurrence of mold that occurred on the surface of the coating film was visually observed after five years from the installation, and evaluated by the following standards.

○ (good): No noticeable occurrence of mold was observed on the surface of the coating film.

x (bad): Mold was generated over the entire surface of the coating film.

TABLE 1

| | Ex. | | 1 | 2 | 3 | 4 | 5 | 6 | 7 | 8 |
|---|---|---|---|---|---|---|---|---|---|---|
| Blend (parts by mass) | Polymer (A1-1) | | 46.8 | 36.4 | 49.4 | 10.0 | — | 46.8 | 52.0 | — |
| | PVDF-1 | | — | — | — | — | 35.5 | — | — | — |
| | Polymer (B-1) | | 5.2 | 15.6 | 2.6 | 6.7 | 10.0 | — | — | — |
| | Polymer (BX-1) | | — | — | — | — | — | 5.2 | — | — |
| | Resin (C-1) | | — | — | — | 38.9 | — | — | — | 52.0 |
| | Resin (C-2) | | — | — | — | — | 19.3 | — | — | — |
| | Curing agent-1 | | 13.0 | 13.0 | 13.0 | 9.5 | — | 13.0 | 13.0 | 7.6 |
| | Curing catalyst-1 | | 0.0063 | 0.0063 | 0.0063 | 0.0063 | — | 0.0063 | 0.0063 | 0.0050 |
| | Titanium oxide pigment | | 35.0 | 35.0 | 35.0 | 35.0 | 35.0 | 35.0 | 35.0 | 32.1 |
| | Degassing agent | | 0.4 | 0.4 | 0.4 | 0.4 | 0.4 | 0.4 | 0.4 | 0.4 |
| | Surface control agent | | 1.0 | 1.0 | 1.0 | 1.0 | 1.0 | 1.0 | 1.0 | 1.0 |
| Amount of polymer (B-1) (parts by mass) | | | 11.1 | 42.9 | 5.3 | 67 | 28.2 | — | — | — |
| Evaluation results | Water contact angle | Initial | ○ | ○ | ○ | ○ | ○ | X | X | X |
| | | After immersing in water | ○ | ○ | ○ | ○ | ○ | X | X | X |
| | | After wiping | ○ | ○ | ○ | ○ | ○ | X | X | X |
| | Contact angle (hexadecane) | Initial | ○ | ○ | ○ | ○ | ○ | X | X | X |
| | Stain resistance (1) | | ◎ | ◎ | ◎ | ◎ | ◎ | ○ | ○ | ○ |
| | Stain resistance (2) | | ◎ | ◎ | ◎ | ◎ | ◎ | △ | △ | △ |
| | Resistance to adhesion of organisms | | ○ | ○ | ○ | ○ | ○ | X | X | X |

As shown by the results in Table 1, according to Ex. 1 to 5 using the powder (powder coating material) composed of the composition for powder coating material containing the polymer (B-1), it was possible to form coating films which were excellent in the water contact angle not only at the initial but also after immersion in water and after wiping. Moreover, these coating films were excellent also in stain resistance and resistance to adhesion of organisms.

On the other hand, the coating film formed by the powder composed of the composition for powder coating material containing no polymer (B-1) or the composition for powder coating material containing the polymer (BX-1) in place of the polymer (B-1), had a low contact angle (water, hexadecane) and was inferior in each of the stain resistance (1), the stain resistance (2) and the resistance to adhesion of organisms.

INDUSTRIAL APPLICABILITY

The powder coating material of the present invention is particularly useful for coating of plumbing wall material for kitchen, bathroom, wash room, toilet, etc., surface material for storage furniture such as a cupboard, etc., road signs such as traffic lights, etc., exterior members for construction such as an aluminum composite panel, an aluminum panel curtain wall, an aluminum frame for curtain wall, an aluminum window frame, etc., exterior members for e.g. oil tanks, natural gas tanks, ceramic building materials, housing exterior materials, automobile parts, aircraft members, railway vehicle members, solar cells back seat members, wind power towers, wind power blades, etc.

This application is a continuation of PCT Application No. PCT/JP2015/081380, filed on Nov. 6, 2015, which is based upon and claims the benefit of priority from Japanese Patent Application No. 2014-229271 filed on Nov. 11, 2014. The contents of those applications are incorporated herein by reference in their entireties.

What is claimed is:

1. A composition for powder coating material comprising polymer (A) composed of at least one member selected from the following polymer (A1) and polyvinylidene fluoride, and the following polymer (B),
Polymer (A1): a fluorinated non-block copolymer having units based on a fluoroolefin and units based on a monomer having a crosslinkable group,
Polymer (B): a fluorinated block copolymer having a segment (α) in which the content of fluorine atoms is at least 20 mass %, and a segment (β) in which the content of fluorine atoms is less than 20 mass %, wherein the difference in the numerical value of the content of fluorine atoms as represented by mass % between in said segment (α) and in said segment (β) is at least 10, and at least one of said segment (α) and said segment (β) has a hydroxy group.

2. The composition for powder coating material according to claim 1, wherein the content of the polymer (B) is from 0.1 to 100 parts by mass, to 100 parts by mass of the polymer (A).

3. The composition for powder coating material according to claim 1, wherein the units based on a monomer having a crosslinkable group in the polymer (A1) are units based on a monomer having a hydroxy group.

4. The composition for powder coating material according to claim 1, wherein said segment (α) has a unit based on a monomer having a perfluoroalkyl group having from 3 to 21 carbon atoms.

5. The composition for powder coating material according to claim 1, wherein the segment having a hydroxy group in the polymer (B) has a unit based on a monomer having a hydroxy group.

6. The composition for powder coating material according to claim 1, wherein the segment having a hydroxy group in the polymer (B) is the segment (β).

7. The composition for powder coating material according to claim 1, which further contains a resin (C) being a resin other than the polymer (A) and the polymer (B).

8. The composition for powder coating material according to claim 7, wherein the resin (C) is at least one member selected from an acrylic resin, a polyester resin, a polyurethane resin, an epoxy resin and a silicone resin.

9. The composition for powder coating material according to claim 7, wherein the resin (C) is a resin having hydroxy groups or carboxy groups.

10. The composition for powder coating material according to claim 1, wherein the composition for powder coating material further contains a curing agent.

11. A powder coating material comprising a powder composed of the composition for powder coating material as defined in claim 1.

12. A coated article having a coating film formed from the powder coating material as defined in claim 11.

13. The coated article according to claim 12, wherein the water contact angle of the coating film is from 95 to 160°.

14. The coated article according to claim 12, wherein the material of the substrate is aluminum.

* * * * *